Jan. 29, 1924.
W. F. BOLESKY
1,482,110
METHOD AND APPARATUS FOR CUTTING POLYGONAL DIES
Filed Aug. 15, 1921
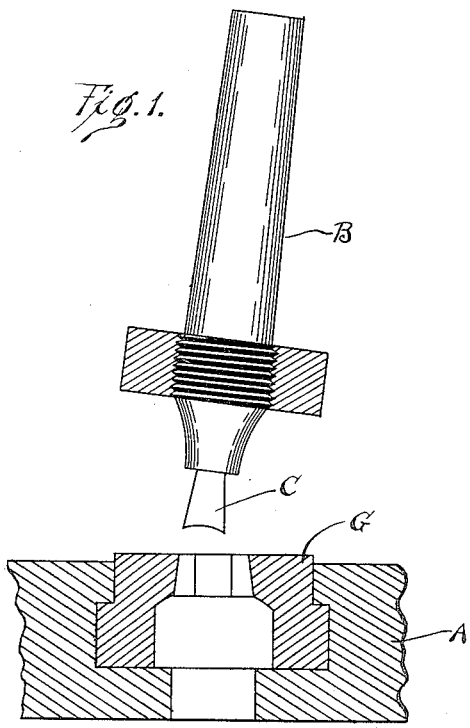
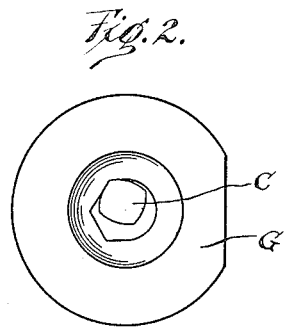
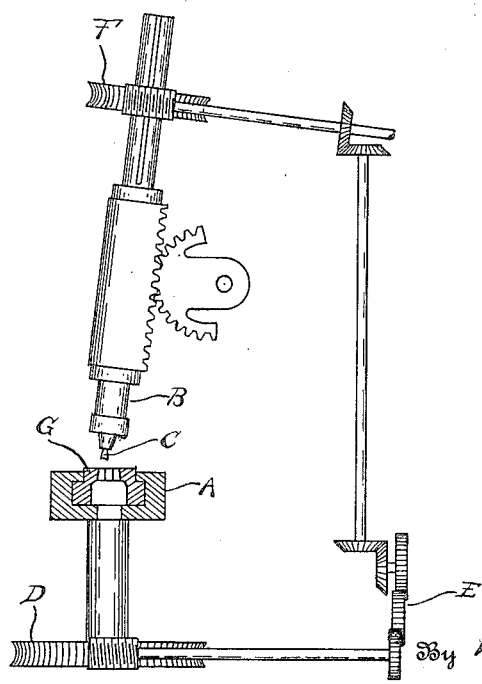
Inventor
William F. Bolesky.
By Whittemore Hulbert Whittemore
+ Belknap   Attorneys Patented Jan. 29, 1924.

1,482,110

UNITED STATES PATENT OFFICE.

WILLIAM F. BOLESKY, OF DETROIT, MICHIGAN, ASSIGNOR OF ONE-HALF TO JOHN E. MOLONEY, OF DETROIT, MICHIGAN.

METHOD AND APPARATUS FOR CUTTING POLYGONAL DIES.

Application filed August 15, 1921. Serial No. 492,326.

*To all whom it may concern:*

Be it known that I, WILLIAM F. BOLESKY, a citizen of the United States, residing at Detroit, in the county of Wayne and State of Michigan, have invented certain new and useful Improvements in Methods and Apparatus for Cutting Polygonal Dies, of which the following is a specification, reference being had therein to the accompanying drawings.

The invention relates to the manufacture of polygonal dies such as are used for the shearing of bolt heads, nuts and similar articles, and it is the object of the invention to simplify the process of manufacture. To this end the invention consists in the method and apparatus as hereinafter set forth.

In the drawings:

Figure 1 is a sectional side elevation of a portion of my improved machine;

Figure 2 is a plan view;

Figure 3 is a diagrammatic representation of the timing mechanism.

In the manufacture of polygonal shearing dies it is necessary not only to form a polygonal aperture of the desired shape, but also to taper the walls of the die so as to provide clearance for the work back of the shearing edge. The original aperture through the die can be formed by drilling, but to produce the polygonal tapered form, a number of operations are required. Thus by broaching, the round aperture may be changed to polygonal form, and by setting the work at an angle to the direction of movement of the broach a taper is produced, but inasmuch as the cutting tool will cut a path of uniform width, the corners are left unfinished. The corners are generally cleared out by filing and the labor required in this operation is a large factor in the cost of manufacture. With my improved method the blank provided with a round aperture therethrough can be automatically fashioned to the polygonal tapering form desired and without attention on the part of the operator other than the engagement of the blanks and removal of the finished work. This method comprises broadly the simultaneous rotation and the relative reciprocation of the blank and cutting tool, the axes of rotation being eccentric and non-parallel. This method may be carried out by a machine of the type heretofore used, but with certain modifications which adapt it to the peculiar character of the operations to be performed.

In detail, A is a revoluble workholder and B is a revoluble and reciprocating plunger. The axis of the plunger B is non-parallel to the axis of the work holder A and provision is also made for relative lateral adjustment to vary the eccentricity of said axis. The cutting tool C is mounted upon the plunger B and is of a form which, during the relative rotations of the members A and B, will trace a polygonal path. It is not necessary that the cutter should correspond in number of sides to the work to be cut thereby and as shown, a quadrangular cutter is used for cutting a hexagonal die. The timing of the relative rotation is, however, such that the angles of the cutter will be successively registered with the angle of the work and the form of the curve intermediate the angles of the cutter is such as to develop a straight line of predetermined length by the relative rotations.

Thus as diagrammatically shown in Figure 3, the work-holder A has connected therewith the gear wheel D which, through the medium of intermediate gears E, is connected to a gear wheel F on the plunger B. The ratio of these gears is 3 to 2, so that for each revolution of the work-holder A the cutter C is revolved 1½ revolutions. This will produce from the quadrangle cutter a hexagonal die.

In forming the work the die blank G having a round hole bored therein, is engaged with the work holder A. The machine is then started to impart a reciprocatory movement to the cutter C and a simultaneous rotary movement to the work-holder A and to the cutter. The operation then continues automatically until the cycle is completed, after which the finished die is removed and replaced by an uncut blank. No attention is required by the workman after the blank is engaged by the holder and no high degree of skill is required for the setting operation. Therefore, the cost of production is greatly reduced.

What I claim as my invention is:

1. The method of cutting polygonal members comprising the simultaneous rotation of a blank and cutter about eccentric non-parallel axes and the relative reciprocation of the same parallel to the axis of the cutter.

2. The method of cutting polygonal members comprising the simultaneous rotation of a blank and an angular cutter therefor about eccentric non-parallel axes, the rotary movement of said members being timed to register the angles of the cutter with predetermined points in the revolution of the work, and the contour of the cutter between angles being such as to develop a straight line in the work and the relative reciprocation of the cutter and work parallel to the axis of the cutter.

3. The method of cutting polygonal members comprising the simultaneous rotation of a blank and an angular cutter therefor about eccentric non-parallel axes and at different angular speeds, the timing of said relative rotations being such as to register the angles of the cutter with a predetermined number of equi-spaced points in the work and the contour of the cutter between angles being such as to develop a straight line in the work and the relative reciprocation of the work and cutter parallel to the axis of the latter to develop a truncated quadrangular form in the work.

4. The method of cutting polygonal dies comprising the boring of a circular hole in the blank, simultaneously rotating the blank and an angular cutter about eccentric non-parallel axes and at different angular speeds, the timing being such as to register the angles of the cutter with a predetermined number of points in the circumference of the work and the contour of the cutter between angles being such as to develop a predetermined line in the work and relatively reciprocating the cutter and work parallel to the axis of the former.

5. A machine for cutting polygonal blanks comprising a rotary work-holder, a cutter rotatable about an axis eccentric and non-parallel to the axis of rotation of said work-holder, timing mechanism between said cutter and work-holder for determining the relative rotations thereof, and means for reciprocating the cutter parallel to its axis and in operative relation to the work.

6. The method of forming surfaces comprising a simultaneous rotation of a blank and a cutter in predetermined timed relation and the relative reciprocation of the same in a direction non-parallel to the longitudinal axis of the blank.

7. The method of cutting polygonal members comprising the simultaneous rotation of a blank and an angular cutter therefor at different angular speeds, the timing of said relative rotations being such as to register the angles of the cutter with a predetermined number of equi-spaced points in the work, and the contour of the cutter between angles being such as to develop a straight line in the work, and the relative reciprocation of the work and cutter in a direction non-parallel to the axis of the former to develop a truncated quadrangular form in the work.

8. The method of cutting polygonal dies comprising the boring of a circular hole in the blank simultaneously rotating the blank and an angular cutter at different angular speeds, the timing being such as to register the angles of the cutter with a predetermined number of points in the circumference of the work and the contour of the cutter between angles being such as to develop a predetermined line in the work, and relatively reciprocating the cutter and work in a direction non-parallel to the axis of the latter.

9. The method of forming surfaces in a member comprising the simultaneous rotation of a blank and a cutter about eccentric non-parallel axes at different angular speeds in predetermined timed relation and the relative reciprocation of the same.

10. The method of forming surfaces in a member comprising simultaneously rotating a blank and a cutter about eccentric non-parallel axes at different angular speeds in predetermined timed relation and relatively moving the same longitudinally of the blank.

11. A machine for cutting blanks comprising a rotary work holder, an angular cutter rotatable about an axis eccentric and non-parallel to the axis of rotation of said work holder, timing mechanism for synchronizing the relative rotation thereof whereby the angles of said cutter register with a predetermined number of points in the work, means for relatively reciprocating the cutter, and work non-parallel to the axis of the latter.

12. A machine for cutting polygonal blanks comprising a rotary work holder, an angular cutter, means for simultaneously rotating the cutter and work holder at different angular speeds, means for synchronizing said rotations whereby the angles of said cutter register with a predetermined number of points in the circumference of the work, said cutter having a contour between the angles such as to develop a straight line in the work during said synchronized rotation, and means for relatively moving the cutter and the blank in a direction non-parallel to the axis of the latter.

In testimony whereof I affix my signature.

WILLIAM F. BOLESKY.